H. B. JOHNSTON.
PISTON AND PISTON RING.
APPLICATION FILED DEC. 1, 1919.
1,335,339.
Patented Mar. 30, 1920.
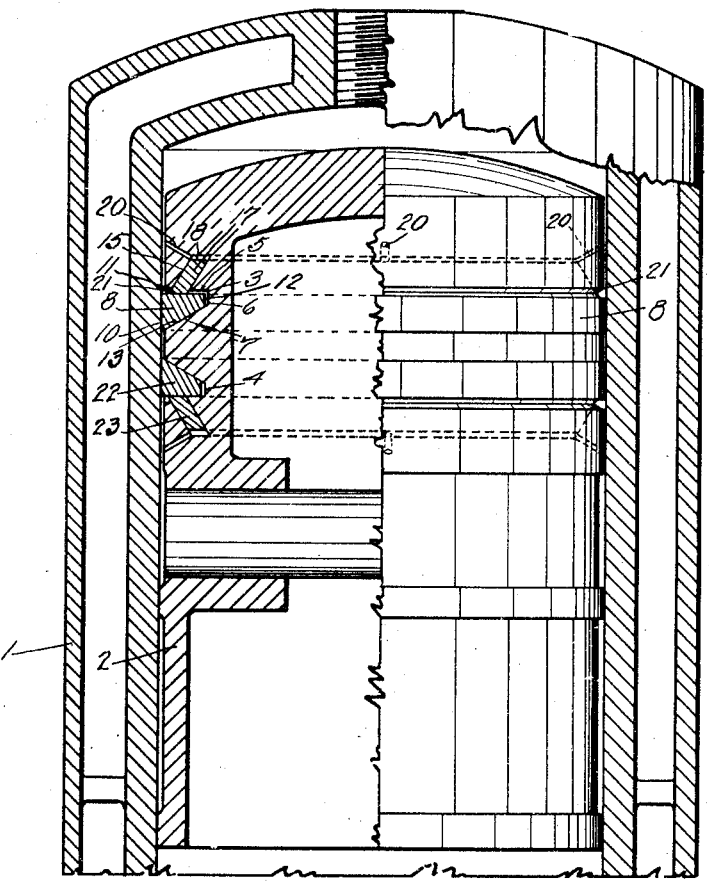
Inventor
Harry B. Johnston,
By his Attorney
Horace Barnes.

UNITED STATES PATENT OFFICE.

HARRY B. JOHNSTON, OF SEATTLE, WASHINGTON.

PISTON AND PISTON-RING.

1,335,339.　　　　Specification of Letters Patent.　　Patented Mar. 30, 1920.

Application filed December 1, 1919.　Serial No. 341,661.

*To all whom it may concern:*

Be it known that I, HARRY B. JOHNSTON, a citizen of the United States, residing at Seattle, in the county of King and State of Washington, have invented certain new and useful Improvements in Pistons and Piston-Rings, of which the following is a specification.

This invention relates to improvements in pistons and metallic piston rings therefor. One of the objects of the invention is the provision of a piston provided with metallic piston rings formed and designed to expand with the pressure within the cylinder or crank-case, respectively, to afford a leak-proof sliding joint between the piston and cylinder wall.

A further object of the invention is the provision of means rendered operative by the pressure within the cylinder and crank-case, respectively, for overcoming any looseness in the fit of the main piston rings in their grooves due to wear and the like.

The invention consists in the novel construction of a piston and grooves therein, and in the combination and adaptation of piston rings and auxiliary pressure rings, as will be hereinafter fully described, illustrated in the accompanying drawing, and finally set forth in the appended claims.

Referring to said drawings, representing an engine-cylinder with piston and rings therefor, embodying my invention, shown partly in longitudinal section and partly in elevation, the reference numeral 1 indicates the engine cylinder and 2 the piston operative therein in the usual manner. Said piston is provided with a plurality of annular ring grooves, as 3 and 4.

Ring groove 3 is formed with an upper wall 5 at right angles to the outer circular face of the piston, a rear wall 6 parallel with said circular face, and a lower wall 7 extending from said rear wall downwardly at a suitable inclination to the outer circular face. Said groove 3 is provided with metallic piston ring 8 split in the usual or any suitable manner, and having an outer vertical face 10, an upper face 11 and rear face 12 corresponding and adapted to fit groove-walls 5 and 6, respectively, and a lower inclined face 13 of the same inclination as the lower wall 7 of the groove.

The upper wall 5 of groove 3 is undercut to provide an annular channel 15 having parallel walls 16 inclined toward the longitudinal axis of the piston. A pressure ring 17 is provided for said channel 15 whose inner and outer faces are parallel with inclinations corresponding to the inclination of the walls 16 of the channel 15. The lower face of said pressure ring 17 is parallel with and disposed to bear against the upper face 11 of the ring 8.

Clearence space 18 is provided at the upper end of said channel 15 and a plurality of bores 20 are spaced about the circumference of the piston connecting said space 18 with the slight opening between the cylinder walls and the piston above the ring 8.

One of the main purposes of the pressure ring 17 is to bear upon the piston ring 8 and maintain the latter in constant contact with the lower inclined wall 7 whereby any lost motion or play of the ring 8 between the upper and lower walls of the groove 3 will be prevented. The action of the compressed gases within the cylinder above the piston through the bores 20 upon the pressure ring, as well as the expansion of the ring itself, will cause the latter to bear with relatively even pressure upon the piston ring 8 and not only hold the piston ring against "slapping" in case of play within its groove, but will tend to maintain the piston ring in steady operative contact with the cylinder wall under variations of load and working conditions.

The walls of the piston may be chamfered, as at 21, into the upper wall of the groove 3 to provide a more ready access of the gas pressure upon the piston ring.

At 22 and 23 are indicated piston and pressure rings, respectively, arranged in inverted position to those previously described which act inversely to those, as will be more fully described.

The pressure from within the cylinder above will force the ring 8 downwardly upon the inclined wall 7 which will be crowded outwardly by the reaction of the inclined face 13 upon said lower wall 7 and into close contact with the walls of the cylinder, and thereby preventing loss of compression within the explosion chamber.

The return stroke of the piston will tend to retract the ring 8 from the piston walls and if there is any looseness in the fit of the piston ring in its groove, will cause it to slap against the upper wall of the groove. This is prevented by the provision of the pressure ring 17 which is not influenced by suction below the piston and is affected more or less by the pressure above it and with its own inherent expansiveness to maintain a relatively constant and uniform pressure upon the piston ring to modify the action of the latter and make the same more effective.

When the pressure occurs below the piston, or a partial vacuum is produced thereabove, the rings 22 and 23 will effectually perform like functions, respectively, to those just described to prevent the leakage of oil from the crank case into the cylinder around the sides of the piston.

While I have confined my description of my invention specifically to a particular form thereof, I do not intend to limit myself to such precise construction or arrangement more than is pointed out in the claims, but on the contrary I contemplate all proper and suitable changes within such limits as may be hereinafter found desirable or expedient.

What I claim as my invention, is—

1. A piston having an annular piston ring groove formed with one of its side walls inclined downwardly and outwardly from its rear, a channel undercut into the side walls opposite said inclined wall, a piston ring disposed within said groove having an inclined face corresponding to said inclined groove wall and a pressure ring disposed within said channel having its lower face arranged to bear upon the upper face of the piston ring said piston having communication between said channel and the outer wall of the piston to permit the gas from the chamber to enter the channel and press down upon the pressure ring thereby forcing the piston ring against the cylinder wall.

2. A piston having an annular piston ring groove formed with one of its side walls inclined downwardly and outwardly from its rear, an inclined channel undercut into the side wall opposite said inclined wall, a piston ring disposed within said groove having an inclined face corresponding to said inclined groove wall, and another face diverging outwardly relative to the inclined face, and a pressure ring disposed within said channel having its lower face arranged to bear upon the upper face of the piston ring whereby any tendency to force the piston ring into its groove will tend to wedge the pressure ring into its channel.

3. A piston having an annular piston ring groove formed with one of its side walls inclined downwardly and outwardly from its rear wall, an obliquely arranged channel undercut into the side walls opposite said inclined wall, a piston ring disposed within said groove having an inclined face coresponding to said inclined groove wall, and a pressure ring disposed within said channel having its lower face arranged to bear upon the upper face of the piston ring, said piston having communicating bores between said channel and the outer wall of the piston to permit the gas from the chamber to enter the channel and press down upon the pressure ring, thereby forcing the piston ring against the cylinder wall.

4. A piston having an annular piston ring groove formed with one of its side walls inclined from its rear outwardly, an obliquely disposed annular channel communicating with said groove from the side wall opposite said inclined wall.

5. A piston having an annular piston ring groove formed with one of its side walls inclined from its rear outwardly, an inclined annular channel communicating with said groove from the side wall opposite said inclined wall and having communication between the top of the groove and the wall of the piston.

6. A piston having an annular piston ring groove formed with one of its side walls inclined downwardly and outwardly from its rear wall, an inclined channel undercut into the side walls opposite said inclined wall, a piston ring disposed within said groove having an inclined face corresponding to said groove wall, and a pressure ring disposed within said channel having its lower face arranged to bear upon the upper face of the piston ring, said piston having communication between said channel and the outer wall of the piston to permit the gas from the chamber to enter the channel and press down upon the pressure ring thereby forcing the piston ring against the cylinder wall.

Seattle, Washington, November 24, 1919.

HARRY B. JOHNSTON.